US011516960B2

(12) United States Patent
Ryan et al.

(10) Patent No.: US 11,516,960 B2
(45) Date of Patent: Dec. 6, 2022

(54) GAUGE WHEEL FOR AGRICULTURAL APPLICATIONS

(71) Applicants: Paul Edward Ryan, Horsham (AU); Yan Wang, Black Rock (AU)

(72) Inventors: Paul Edward Ryan, Horsham (AU); Yan Wang, Black Rock (AU)

( * ) Notice: Subject to any disclaimer, the term of this patent is extended or adjusted under 35 U.S.C. 154(b) by 279 days.

(21) Appl. No.: 16/616,586

(22) PCT Filed: May 22, 2018

(86) PCT No.: PCT/AU2018/050494
§ 371 (c)(1),
(2) Date: Nov. 25, 2019

(87) PCT Pub. No.: WO2018/213879
PCT Pub. Date: Nov. 29, 2018

(65) Prior Publication Data
US 2021/0289689 A1  Sep. 23, 2021

(30) Foreign Application Priority Data

May 23, 2017 (AU) .............................. 2017901951

(51) Int. Cl.
*A01C 7/20* (2006.01)
*A01C 5/06* (2006.01)
*A01B 15/18* (2006.01)

(52) U.S. Cl.
CPC .............. *A01C 7/203* (2013.01); *A01C 5/064* (2013.01); *A01B 15/18* (2013.01); *B60B 2900/211* (2013.01)

(58) Field of Classification Search
CPC .. A01C 7/203; B60B 9/06; B60B 9/08; B60B 2900/211; B60C 7/20
See application file for complete search history.

(56) References Cited

U.S. PATENT DOCUMENTS 1,865,457 A * 7/1932 Cruz ......................... B60C 7/20
                                                        152/285
4,534,417 A * 8/1985 Weatherholt ........... A01B 23/06
                                                        172/519
(Continued)

FOREIGN PATENT DOCUMENTS

DE      69616283      *  5/2007  ............. A01C 5/068
EP    0201047 A2 * 11/1986  ............. A01C 5/062

OTHER PUBLICATIONS

International Search Report and Written Opinion Form PCT/ISA/210 and PCT/ISA237, International Application No. PCT/AU2018/050494, pp. 1-9, International Filing Date May 22, 2018, dated Jul. 18, 2018.

(Continued)

Primary Examiner — Thomas B Will
Assistant Examiner — Ian A Normile
(74) Attorney, Agent, or Firm — Bochner IP, PLLC; Andrew D. Bochner

(57) ABSTRACT

A gauge wheel (1) for use in controlling the depth of a furrow formed by at least one planting member of cultivation equipment includes a hub member (5) having a central hub and an outer peripheral portion (9); and a resilient coil member (3). The resilient coil member (3) includes a plurality of coil windings (17) which extend closely adjacent to the outer peripheral portion (9) of the hub member (5) and which define an outer periphery of the gauge wheel (1). The coil member (3) is connected at or adjacent one end thereof to the hub member (5). In use, the resilient coil member engages the soil on a side of the furrow and controls the depth by which the at least one planting member cuts into the soil to form the furrow. There is also provided a coulter gauge wheel which includes a coulter disc and at least one gauge wheel as described above.

15 Claims, 2 Drawing Sheets

(56) References Cited

U.S. PATENT DOCUMENTS

| | | | |
|---|---|---|---|
| 5,970,891 A | 10/1999 | Schlagel | |
| 6,325,156 B1 * | 12/2001 | Barry | A01B 15/18 |
| | | | 172/518 |
| 7,584,706 B1 * | 9/2009 | Smith | A01B 35/28 |
| | | | 111/137 |
| 9,474,203 B2 * | 10/2016 | Anderson | A01C 5/06 |
| 2012/0104835 A1 * | 5/2012 | Waldner | A01C 7/203 |
| | | | 301/64.101 |
| 2013/0186658 A1 | 7/2013 | Kester | |
| 2014/0116735 A1 | 5/2014 | Bassett | |

OTHER PUBLICATIONS

International Preliminary Report on Patentability, dated Nov. 26, 2019, pp. 1-3.

* cited by examiner

GAUGE WHEEL FOR AGRICULTURAL APPLICATIONS

CROSS-REFERENCE TO RELATED APPLICATIONS

The present application is a US national phase of PCT Application No. PCT/AU2018/050494, filed on May 22, 2018, which claims priority to Australian Patent Application No. 2017901951, filed May 23, 2017, the disclosures of both of which are incorporated herein by reference in their entireties.

FIELD OF THE INVENTION

The present invention is generally directed to agricultural equipment, and in particular to a gauge wheel for use in agricultural applications.

BACKGROUND OF THE INVENTION

Gauge wheels are used in cultivation equipment to set the depth of either a disc or tine for planting seed. The gauge wheel can be either fitted to the outside of the disc assembly on the same axle, or on another axle with an adjustment arm, or in front of a tine. The gauge wheel follows the ground to allow the seeding tool to place the seed at the preferred depth of the gauge wheel. The gauge wheel, when used for planting with disc assemblies, also acts as a hold down item to help with the cutting of the stubble and trash from the last harvest and to reduce the 'soil through', i.e. minimize the disturbance of the soil layer.

Gauge wheels presently have a metal hub supporting an external rubber tyre. The rubber of these gauge wheels do however wear over time. In addition, mud can build up on the gauge wheel during normal use. The clumps of mud on the gauge wheel can cause the wheel to bounce. Also, the build up of mud over the periphery of the gauge wheel can change its working diameter. These issues reduce the accuracy of the gauge wheel in setting the seed planting depth, and in the overall functioning of the gauge wheel.

It is therefore desirable to provide a gauge wheel that alleviates one or more of the disadvantages associated with known gauge wheels.

SUMMARY OF THE INVENTION

According to a first aspect of the invention, there is provided a gauge wheel for use in controlling the depth of a furrow or furrows formed at least one planting member of cultivation equipment, the gauge wheel including:
a hub member having a central portion and an outer peripheral portion; and
a resilient coil member including a plurality of coil windings extending closely adjacent to the outer peripheral portion of the hub member and defining an outer periphery of the gauge wheel;
the coil member being connected at or adjacent one end thereof to the hub member.

As used herein, the term "gauge wheel" refers to a wheel specifically adapted for use in cultivation equipment that includes at least one planting member which forms a furrow in soil for planting seeds or young plants. In use, the gauge wheel is adapted to control the depth of the furrow that is formed by the planting member of the cultivation equipment.

The outer peripheral portion of the hub member may include a plurality of arm members extending substantially laterally relative to the central portion thereof.

The hub member may further include a peripheral flange extending radially therefrom. The arm members may extend from the central portion to the peripheral flange. The peripheral flange may have an outer diameter at least substantially equal to the outer periphery of the gauge wheel.

The coil member may be secured at one end thereof by at least one bracket to a face of the central portion.

The central portion of the hub member may further include a hub assembly about which the gauge wheel can be pivotally supported.

The gauge wheel is particularly adapted for use in cultivation equipment that includes at least one planting member in the form of a rotatable disc that is adapted to cut a furrow in soil for planting. In use, the resilient coil member of the gauge wheel controls the depth of the furrow formed by the planting member as the cultivation equipment is advanced over the ground.

According to a second aspect of the invention, there is provided cultivation equipment including:
at least one planting member adapted to form a furrow in soil; and
a gauge wheel as described above and supported by the cultivation apparatus, wherein, in use, the at least one resilient coil member engages the soil on a side of the furrow and controls the depth by which the at least one planting member cuts into the soil to form the furrow.

In one embodiment, the at least one planting member comprises a disc member. The disc member may be supported on a shaft of the cultivation equipment.

The shaft of the cultivation equipment is preferably a rotatable shaft. The disc member may be fixedly mounted on the rotatable shaft, such that only the shaft and the disc member rotate relative to the ground as the cultivation equipment is advanced over the ground.

Alternatively, the shaft may be fixed relative to the cultivation equipment with the at least one disc rotatably mounted on the shaft, such that only the disc member rotates relative to the ground as the cultivation equipment is advanced over the ground.

The hub of the gauge wheel may be mounted to the shaft of the on which the at least one rotatable disc member is mounted.

In one embodiment, the cultivation equipment includes a plurality of rotatable disc members mounted on the shaft of the cultivation equipment.

In another embodiment, the cultivation equipment includes at least one planting tine, and the at least one planting member comprises a coulter disc mounted on the equipment in advance of the at least one planting tine. In this embodiment, coulter disc travels ahead of the at least one planting tine and makes a vertical cut in the soil to form a narrow furrow in advance of the at least one planting tine. The planting tine then widens the furrow for planting seeds or young plants.

In the above embodiment, the hub of the gauge wheel may be mounted on an axle for the coulter disc so that the gauge wheel rotates with the coulter disc.

According to a third aspect of the present invention, there is provided a coulter gauge wheel for agricultural applications, including:
a coulter disc;
at least one gauge wheel according to the first aspect of the invention and supported on at least one side of the coulter disc, the coulter disc having an diameter greater than an outer periphery of the gauge wheel.

The coulter gauge wheel may include a pair of gauge wheels according to the first aspect of the invention, the gauge wheels being supported on opposite sides of the coulter disc.

According to a fourth aspect of the invention, there is provided a cultivation equipment including: at least one planting tine; and a coulter gauge wheel according to the third aspect of the invention, wherein the coulter disc and the at least one gauge wheel of the coulter gauge wheel are mounted on the equipment in advance of at least one planting tine, wherein, in use, the coulter disc travels ahead of the at least one planting tine and makes a vertical cut in the soil to form a narrow furrow in advance of the at least one planting member, and the at least one planting member then widens the furrow.

The gauge wheel according to the present invention has significant advantages over known rubber gauge wheels thereby allowing for smoother and more even seed placement. The coil member used in the gauge wheel is self cleaning because any mud stuck to the coil member will be removed due to both lateral and radial flexing of the coil windings of the coil member during use thereof so that the spacing provided between each coil winding can vary allowing for the mud to be separated from the coil member. The flexing of the coil member is facilitated by only securing the coil member at one end to the hub member.

The accurate depth placement for the seed is also achieved because the degree of the radial flexing of the coil member is limited by the coil member being held closely adjacent to the outer peripheral portion of the hub member. This minimizes bounce of the gauge wheel, and also allows the gauge wheel to apply a more even pressure.

The preferred peripheral flange of the hub member also provides benefits when the gauge wheel is mounted on the same axle as a cultivator disc because the flange can aid to scrape mud off from the disc when in use.

Furthermore, the preferred open construction of the hub member facilitates the removal of mud and trash such as straw from the gauge wheel through to the openings provided between each of the arm members.

BRIEF DESCRIPTION OF THE DRAWINGS

It will be convenient to further describe the invention with respect to the accompanying drawings which illustrate preferred embodiments of the gauge wheel according to the present invention. Other embodiments of the invention are possible, and consequently, the particularity of the accompanying drawings is not to be understood as superseding the generality of the preceding description of the invention.

In the drawings.

DETAILED DESCRIPTION OF THE DRAWINGS

Figure 1:
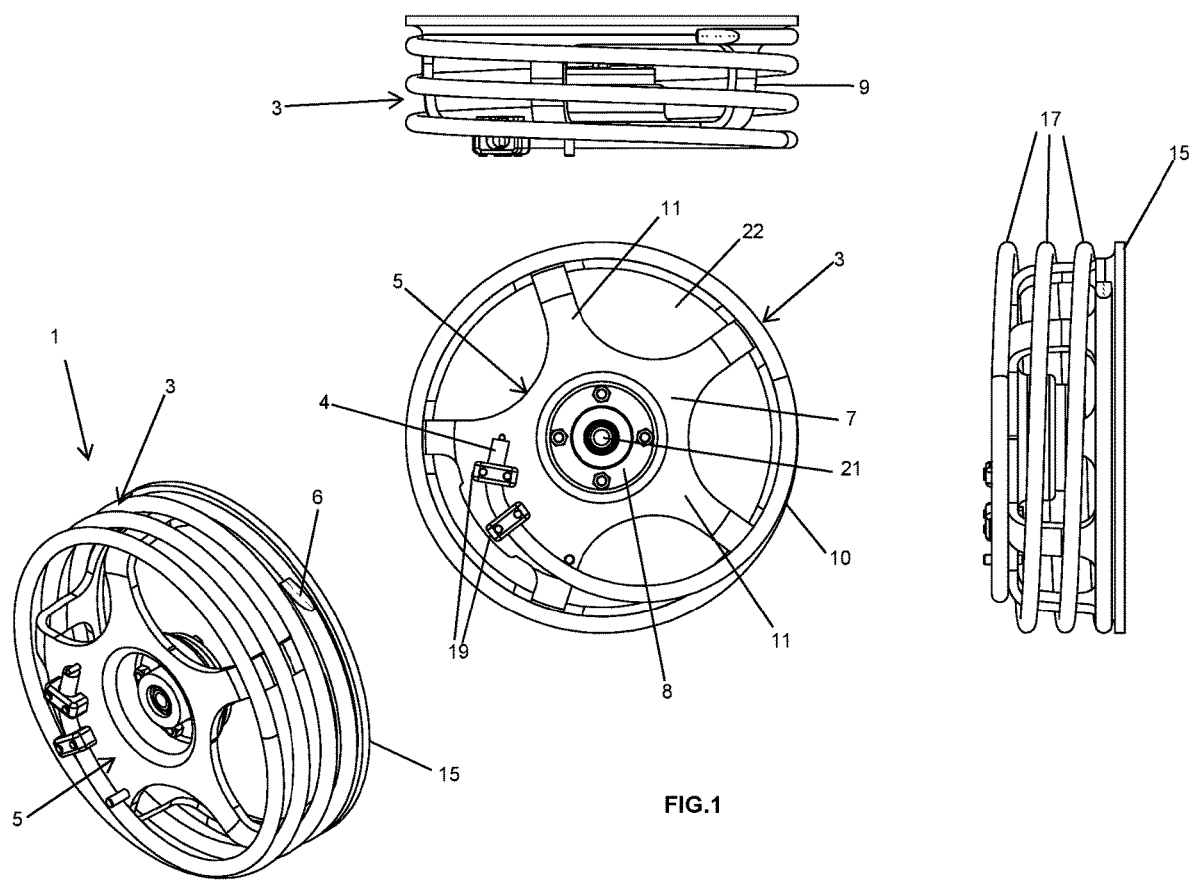
FIG. 1 respectively show a perspective view, a front view, a side view and a top view of a gauge wheel according to the present invention.

Referring initially to FIG. 1, there is shown a first embodiment of a gauge wheel 1 according to the present invention. The gauge wheel includes a hub member 5, about which is supported a resilient coil member 3. The coil member 3 defines an outer periphery 10 of the gauge wheel 1. The hub member 5 includes a central portion 7 and an outer peripheral portion 9 extending generally laterally relative to the central portion 7. The outer peripheral portion 9 of the hub member 5 is provided by a plurality of arm members 11 extending initially radially outwardly from the central portion 7, and then substantially laterally relative to the central portion 7. The hub member 5 is provided with openings (22) between each adjacent arm member 11.

The hub member 5 furthermore includes a peripheral flange 15 extending radially from the rest of the hub member 5. Each arm member 11 extends from the central portion 7 to that peripheral flange 15. The peripheral flange 15 has an outer diameter at least substantially equal to the outer periphery 10 of the gauge wheel 1.

The coil member 3 is made from resilient material, such as spring steel. The use of other resilient materials such as a polymer or reinforced composite material is also envisaged. The coil member 3 includes a series of helical coil windings 17 that generally extend closely adjacent to the outer peripheral portion 9 of the hub member 5. The space in between each helical coil winding 17 and the closely adjacent arm member 7 can typically be in the order of around 5 mm. The present invention is not however restricted to this spacing which may be varied depending on the size and application of the gauge wheel 1. The coil member 3 has a first end 4 which is secured to the hub member 5. Two brackets 19 are used to secure the first end 4 to a face of the central portion 7 of the hub member 5. A coil member 3 has a second, outer end 6 which is not secured to the hub member 5. This arrangement allows the coil windings 17 both laterally and radially to flex to a degree and to allow movement relative to each other during use of the gauge wheel 1. This relative movement acts to minimize or prevent the build up of mud, straw and the like on the gauge wheel 1 when in use. The openings 22 of the hub member 5 also allows straw and other trash to pass therethrough and escape from the gauge wheel 1. The hub member 5 furthermore includes a hub assembly 8 mounted at the central portion 7 of the hub member 5. The hub assembly 8 supports a central bearing 21 which allows the gauge wheel 1 to be pivotally supported on an axle of cultivation equipment (not shown).

The cultivation equipment may be a cultivating machine which includes at least one cutting member adapted, in use, to cut a furrow in soil for planting seeds or young plants.

The cultivating machine may include a cutting disc assembly having one or more rotatable cutting discs for cutting a furrow or furrows. The gauge wheel 1 can be fitted to the outside of the cutting disc assembly on the same axle.

Alternatively, the gauge wheel 1 can be fitted on another axle of a cultivating machine separate from the axle on which the at least one cutting member is provided, either with an adjustment arm, or in the front of, the at least one cutting member. In this case, the at least one cutting member may comprise a cutting time.

In use, when the gauge wheel 1 is mounted on an axle of a cultivating machine having at least one cutting member adapted, in use, to cut a furrow in soil for planting seeds or young plants, the gauge wheel controls the depth of the furrow formed by the cutting member as the cultivation equipment is advanced over the ground.

The outer peripheral portion 9 of the hub member 5 is important in that it restricts the radial motion of the coil windings 17 when in use. This ensures that an accurate depth placement for the seed is achieved because the diameter at the outer periphery 10 of the gauge wheel 1 is held relatively constant.

When the gauge wheel 1 is supported on the same axle as a cutting disc assembly, the peripheral flange 15 of the hub member 5 can also assist in scraping mud away from the cutting disc assembly.

Figure 2:
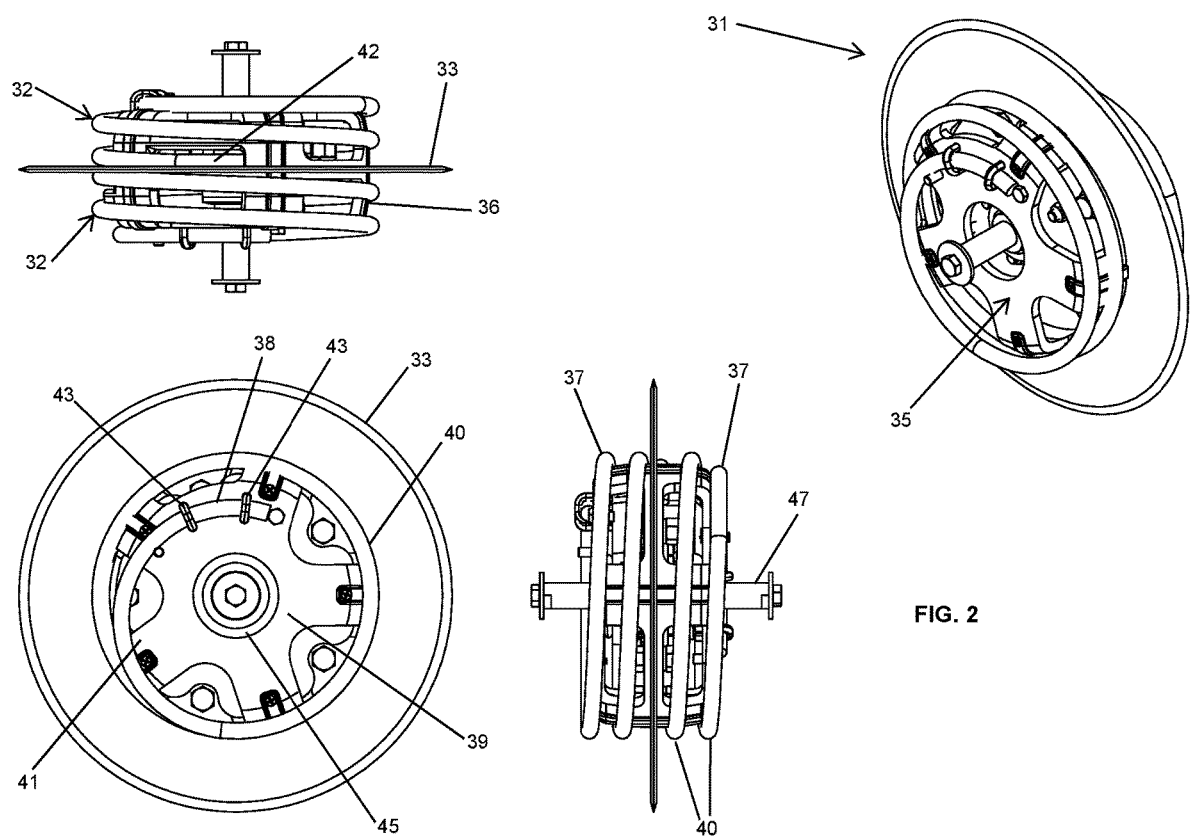
FIG. 2 respectively show a perspective view, a front view, a side view and a top view of a coulter gauge wheel according to the present invention.

FIG. 2 shows a coulter gauge wheel 31 which utilises a gauge wheel 32 according to the present invention. The coulter gauge wheel 31 is typically used in front of a tine of a cultivating machine. In addition to controlling the seed planting depth, the coulter acts to cut straw and other trash in front of the tine.

The coulter gauge wheel 31 includes a coulter disc 33, and gauge wheels 32 on either side of the coulter disc 33. Each gauge wheel 32 shares similar features to the gauge wheel 1 shown in FIG. 1.

Each gauge wheel 32 similarly includes a hub member 35 supporting thereon a coil member 37. The hub member 35 includes a central portion 39 from which extends a plurality of arm members 41. Each arm member 41 extends substantially laterally relative to the central portion 39 to thereby provide an outer peripheral portion 36 for the hub member 35. The arm members 41 extend to and are secured to a respective side of the coulter disc 33. The coil member 37 is secured at a first end 38 to the central portion 39 of the hub member 35 using connecting brackets 43. The second, outer end 42 of the coil member 37 is however not connected to the hub member 35.

A second gauge wheel 32 having identical features is located on the opposite side of the coulter disc 33. The outer diameter of the coulter disc 33 is greater than an outer periphery 40 of each guide wheel 32. A central hub assembly 45 extends through and is mounted within the central portion 39 of each hub member 35. The hub assembly 45 includes an axle assembly 47 extending laterally relative to the plane of the coulter disc 33. This axle assembly 47 allows the coulter gauge wheel 31 to be pivotally supported.

The gauge wheel 32 operates in the same manner as the gauge wheel 1 shown in FIG. 1 with each coil member 37 including a series of helical coil windings 40 that control the depth of the furrow formed by the coulter as the cultivation equipment on which the coulter disc is mounted advances over the ground.

The coulter gauge wheel assembly also allows the gauge wheels 32 to be self-cleaning as previously described. Furthermore, the gauge wheels 32 can also maintain a generally constant outer diameter because the helical coils windings 40 are generally closely adjacent to the outer peripheral portion 36 of the hub member 35.

Modifications and variations as would be deemed obvious to the person skilled in the art are included within the ambit of the present invention as claimed in the appended claims.

What is claimed is:

1. A gauge wheel for use in controlling the depth of a furrow or furrows formed by at least one planting member of cultivation equipment including:
    a hub member having, a central portion and an outer peripheral portion, the outer peripheral portion having a plurality of arm members extending substantially laterally relative to the central portion; and
    a resilient coil member;
    wherein the resilient coil member is connected at or adjacent one end thereof to the central portion of the huh member and includes a plurality of coil windings that extend from the central portion of the hub member to extend closely adjacent to the outer peripheral portion of the hub member to define an outer periphery of the gauge wheel.

2. A gauge wheel according to claim 1, wherein the outer peripheral portion of the hub member includes a peripheral flange.

3. A gauge wheel according to claim 2, wherein the arm members extend from the central portion to the peripheral flange.

4. A gauge wheel according to claim 2, wherein the peripheral flange has an outer diameter at least substantially equal to the outer periphery of the gauge wheel.

5. A gauge wheel according to claim 1, wherein the resilient coil member is secured at one end thereof by at least one bracket to a face of the central portion.

6. A gauge wheel according to claim 1, wherein the central portion of the hub member includes a hub assembly about which the gauge wheel is supported.

7. Cultivation equipment comprising:
    at least one planting member adapted to form a furrow in soil; and
    a gauge wheel according to claim 1 and supported by the cultivation equipment, wherein, in use, the resilient coil member engages the soil on a side of the furrow and controls the depth by which the at least one planting member cuts into the soil to form the furrow.

8. Cultivation equipment according to claim 7, wherein the at least one planting member comprises at least one rotatable disc member.

9. Cultivation equipment according to claim 8, wherein the at least one rotatable disc member is mounted on a shaft of the cultivation equipment.

10. Cultivation equipment according to claim 9, wherein the hub member of the gauge wheel is mounted to the shaft of the cultivation equipment.

11. Cultivation equipment according to claim 7, including at least one planting tine, and wherein the at least one planting member comprises a coulter disc mounted on the equipment in advance of the at least one planting tine.

12. A coulter gauge wheel for use in cultivation equipment including:
    a coulter disc; and
    at least one gauge wheel according to claim 1;
    wherein the at least one gauge wheel is supported on at least one side of the coulter disc, and the coulter disc has a diameter greater than the outer periphery of the gauge wheel.

13. A coulter gauge wheel according to claim 12, wherein the arm members are connected to the coulter disc.

14. A coulter gauge wheel according to claim 12, wherein the resilient coil member is secured at one end thereof by at least one bracket to a face of the central portion of the hub member.

15. A coulter gauge wheel according to claim 12, wherein a pair of gauge wheels are supported on opposite sides of the coulter disc.

* * * * *